United States Patent
Luukkanen et al.

Patent Number: 5,845,235
Date of Patent: Dec. 1, 1998

[54] DIVER'S COMPUTER

[75] Inventors: Jarmo Luukkanen, Helsinki; Ari Nikkola, Espoo, both of Finland

[73] Assignee: Suunto Oy, Espoo, Finland

[21] Appl. No.: 768,841

[22] Filed: Dec. 18, 1996

[30] Foreign Application Priority Data

Dec. 21, 1995 [FI] Finland ................................... 956165

[51] Int. Cl.⁶ ..................................................... G06F 15/00
[52] U.S. Cl. .......................... 702/127; 702/139; 702/140; 128/201.27; 128/202.22; 73/865.1
[58] Field of Search ....................... 364/558; 128/201.27, 128/202.22, 204.18, 204.23; 405/185, 186; 702/139, 140, 127; 73/865.1

[56] References Cited

U.S. PATENT DOCUMENTS

| | | | |
|---|---|---|---|
| 4,782,338 | 11/1988 | Barshinger | 340/754 |
| 4,926,703 | 5/1990 | Budinger | 73/865.1 |
| 5,033,818 | 7/1991 | Barr | 359/630 |
| 5,156,055 | 10/1992 | Hollis et al. | 73/865.1 |
| 5,301,668 | 4/1994 | Hales | 128/205.23 |
| 5,457,284 | 10/1995 | Ferguson | 128/201.27 |
| 5,617,848 | 4/1997 | Cochran | 128/202.22 |

*Primary Examiner*—John E. Barlow, Jr.
*Assistant Examiner*—Hien Vo
*Attorney, Agent, or Firm*—Steinberg & Raskin, P.C.

[57] ABSTRACT

A diver's computer including detectors for measurement and determination of diving parameters, a processor for processing the measured and determined data concerning the diving parameters, and a display for displaying the parameters processed by the processor. The display of the diver's computer includes at least one display part which can be pre-programmed by the operator to display the diving parameter/parameters chosen by the operator. Further, the display includes at least one display part which has been programmed to display the desired parameter/parameters permanently. The display part that can be pre-programmed by the operator can be switched, during diving, momentarily to show other diving parameters as selected by the operator.

19 Claims, 2 Drawing Sheets

DIVER'S COMPUTER

FIELD OF THE INVENTION

The invention relates to a diver's computer which is provided with detectors for measurement and determination of diving parameters, a processor for processing the measured and determined data concerning the diving parameters, and a display for displaying the diving parameters after processing thereof by the processor. The invention also relates to a method for enabling a user to selectively display diving parameters on a diving computer having a display.

BACKGROUND OF THE INVENTION

At present, diver's computers include a display that has been divided into several parts or several displays, in which a number of diving parameters are shown. In conventional diver's computers, attempts are made to display as many quantities as possible, which are typically displayed either in fixed displays and/or in permanently programmed varying displays or parts of displays. In fixed displays, quantities are displayed that are most important and most critical from the point of view of diving, such quantities being, as a rule, the diving depth and the time of direct ascent. If variable displays are used, attempts are made to display less critical but, yet, necessary information.

Modern diver's computers are provided with highly complex detectors, and they include an abundance of functions, which has the result that the number of quantities to be displayed is quite high. Of these quantities to be displayed, for example, the following can be mentioned in the form of a list:

Quantities to be displayed during diving include momentary diving depth, diving time, time of direct ascent, maximal depth during diving, ceiling depth, i.e., the lowest depth to which ascent is permitted during leg diving, leg ascent time, and temperature. Further, the diver's computer can be provided with an ascent speedometer and with various detectors, which give, for example, a warning about excessively rapid ascent or about the ascent having taken place above the ceiling depth, and further with an indicator that gives a warning about the state of the battery.

Quantities to be displayed on the surface are, among other things, the interval on surface, diving time of preceding dive, current number of dive, maximal depth of the preceding dive, data on the diving plan (times of direct ascent corresponding to different depths), temperature, date and time. Further, the diver's computer can give a warning about flight prohibition and/or display the time of flight prohibition, display a leg stop that was not complied with, give a warning concerning the battery, and state the height category and/or the personal setting state. In some devices, the time and the date are also shown during diving.

One such prior art divers computer is described in U.S. Pat. No. 5,156,055 (incorporated by reference herein), which computer is provided with a display divided into several parts so that some parts of the display show selected critical quantities constantly and, besides that, in certain parts of the display, quantities are shown that are varied based on a certain fixed programming.

The attempt to display as many different quantities as possible at the same time results in certain drawbacks, some of which are quite problematic. Since an aim is to provide a device as compact as possible, it one drawback that either the size of the displays or parts of displays must be reduced to such an extent that their reading quality is impaired, or it is necessary to use variable displays, in which, at the time of reading, there is often wrong information. It is a second significant drawback, resulting from the attempt to display a maximal number of quantities at the same time, that the processor and/or the display control must be highly efficient and expensive. Therefore, the cost of a versatile diver's computer is very high.

OBJECTS AND SUMMARY OF THE INVENTION

Accordingly, it is an object of the present invention to provide a novel diver's computer, which provides a significant improvement over the prior art.

It is another object of the present invention to provide a new and improved diver's computer which has a display a part of which can be programmed by a diver to display a diving parameter of particular interest to that diver.

In view of achieving these objects and others, the diver's computer in accordance the invention is mainly characterized in that the display of the computer comprises at least one display part which can be pre-programmed by the operator (usually the diver) to display the diving parameter/parameters selected by the operator. In a situation of use, the operator can separately choose other quantities to be displayed in the display, for example, by using knobs or equivalent manual control mechanisms.

By means of the invention, compared with the prior art, a number of important advantages are obtained, of which the following can be stated in this connection. By means of the diver's computer in accordance with the invention, attempts are not made to display a maximal number of different diving quantities at the same time, but the diver's computer can be pre-programmed to display the quantities constantly that are considered by the diver, i.e., the operator of the device, to be the most important. Other quantities, which are considered by the operator less important, can be shown in the display, for example, by using knobs. In such a case, for example, depressing the knob once produces new quantities on the display, a second depressing movement of the knob produces the next quantities, etc. The quantities selected in this manner for the display remain visible for a certain period of time only, after which the data that have been pre-programmed and considered most important by the operator return to the display.

Thus, compared with the prior art, it is one of the most important differences and advantages of the invention that the diver's computer can be pre-programmed by the operator to display exactly the quantities that are considered most important by the individual operator. In principle, this can even mean that the diver's computer can be provided with one display, in which it is possible to program the diving quantity that is considered by the operator most important to be shown constantly. The other quantities are produced on the display by selecting them separately. From the point of view of reading convenience, it is probably, however, justified to design the device so that the monitor shows one or two most important quantities constantly, in addition to which the next important quantity has been pre-programmed to be shown in the pre-programmable display. It results from all this that the reading quality of the display is substantially better than in the prior art, because the display or the part of display does not have to be of an equally small size as in the prior art.

It is a further significant advantage and improvement of the invention vis-a-vis the prior art that a part of the display can be pre-programmed to display the very quantities that are considered necessary by each particular operator. These quantities vary depending on the particular operator and/or on the situation of operation.

In a most basic embodiment of the invention, the diver's computer includes detector means for measuring and determining diving parameters and processor means coupled to the detector means for receiving and processing the diving parameters, and in accordance with the invention, display means coupled to the processor means for receiving and displaying at least one of the diving parameters and having at least one display part programmed to display a respective user-determined one of the diving parameters, i.e., a diving parameters selected or determined by the user while on the surface and within the capabilities of the detector means. The display means may also comprise at least one additional display part for constantly displaying a permanently selected one of the diving parameters during diving and/or while on the surface, e.g., one parameter for the time of diving and a second parameter while on the surface or one parameter for the time of diving and while on the surface. The diver's computer can include means for switching the display part showing the user-determined diving parameter during diving momentarily to show a second user-determined one of the diving parameters, programming means for enabling the diver to program the display part showing the user-determined diving parameter to display the same, e.g., knobs. The same knobs may be used as display activation means for activating that first display part to display the user-determined diving parameter(s).

The method for enabling a user to selectively display diving parameters on a diving computer having a display in accordance with the invention comprises the steps of selecting one of the diving parameters as a user-determined diving parameter, measuring and determining diving parameters including the user-determined diving parameter, processing the measured and determined diving parameters, and displaying the user-determined processed diving parameter on a display part of the display of the diving computer. Additionally, it is possible to select an additional one of the diving parameters as an additional user-determined diving parameter, and display the additional user-determined processed diving parameter on an additional display part of the display of the diving computer. The diver's computer may be connected to a personal computer, and programmed via the personal computer to display the user-determined diving parameter.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1A:
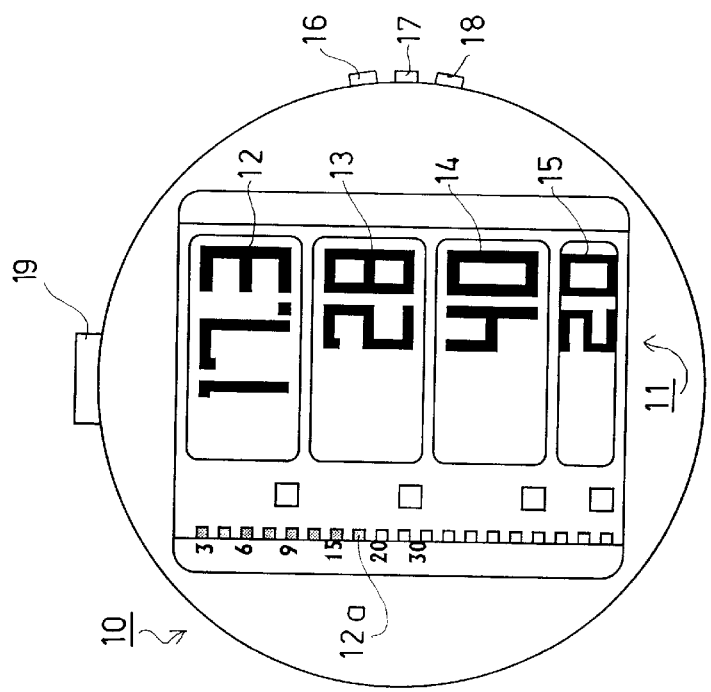
FIG. 1a is a modification of the embodiment shown in FIG. 1.
Figure 1:
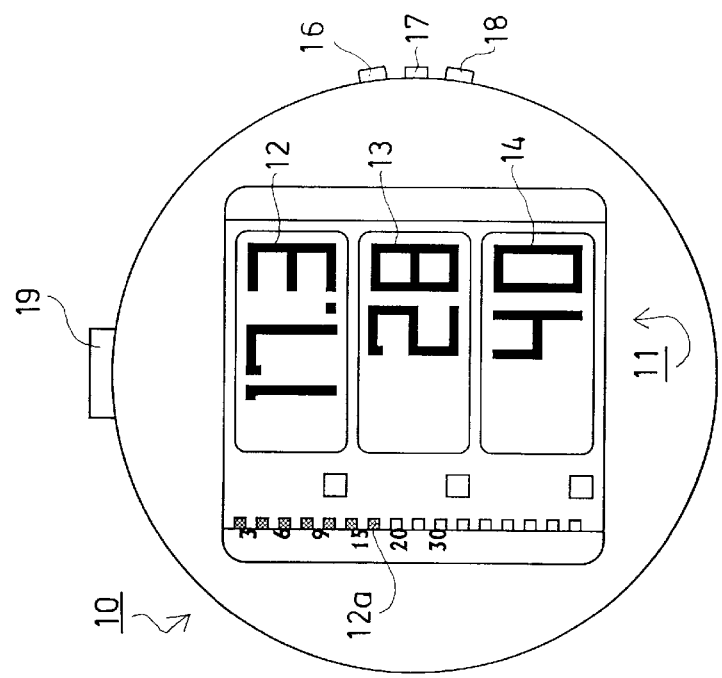
FIG. 1 is a fully schematic illustration of an alternative embodiment of the diver's computer in accordance with the invention.

Referring to the accompanying drawings wherein the same reference numerals refer to the same or similar elements, in FIGS. 1 and 1a, the diver's computer is denoted generally by reference numeral 10. The electronic wirings of the diver's computer 10 are not shown in the figures, but it is fully obvious that the diver's computer 10 is provided with an efficient processor, a versatile system of detectors, and with a source of power or with a connection to a source of power. The diver's computer 10 shown in FIGS. 1 and 1a is further provided with a display 11, which has been divided in FIG. 1 into a plurality of parts 12,12a, 13 and 14 ,and in FIG. 1a into the parts 12,12a, 13,14 and 15. In the embodiments shown in FIGS. 1 and 1a, the first part 12 is a so-called "display No. 1", which has been programmed to display the quantity that is considered most important constantly. In the embodiments shown in these figures, the momentary diving depth has been selected for the "display No. 1". As a matter of fact, this quantity that is considered most important has also been shown in the display part denoted by the reference 12a, in the so-called "auxiliary display", for the sake of clarity of illustration, in a form different from the first part of the display. Further, in FIGS. 1 and 1A, a second display part 13, i.e., the so-called "display No. 2", has been programmed permanently to show the second most important diving quantity. In FIGS. 1 and 1A, as the quantity for the "display No. 2", for example, the available time of direct ascent (so-called no-decompression time) has been chosen. These quantities displayed in the "displays Nos. 1 and 2" are the quantities that are displayed in a diving state. When the diver is on the surface, the "display No. 2" can be programmed permanently, for example, to show the running of surface time.

The third part 14 of the display is, in a diver's computer as shown in FIGS. 1 and 1a, a so-called "display No. 3", which can be pre-programmed by the diver to display the diving quantity desired and chosen by him or her. Further, in FIG. 1a, a variation is shown in which the display 11 further includes a fourth part 15 of the display, i.e., a so-called "display No. 4", which can be pre-programmed by the diver in a corresponding manner. For this purpose, the diver's computer 10 is provided with knobs 16,17,18 or with equivalent manually activated switches, by whose means the diver can preprogram the desired diving quantities for the "display No. 3" 14 and for the "display No. 4" 15. By means of the knobs 16,17,18 or equivalent switches, the diver can, during diving, also select other diving quantities for the displays 14 and 15 for certain periods of time during diving. Different situations require the availability of different information during diving, depending on the operator and on the need. For this reason, it is useful that the diver can, during diving, choose the desired other information to be shown in the "displays Nos. 3 and 4" 14 and 15.

Preferably, the "displays Nos. 3 and 4" 14,15, which are pre-programmable displays, have been arranged, for example, so that for these parts of the display 11, the operator, in particular the diver, has selected while on the surface the quantities that he considers most important, for example maximal depth and diving time. The pre-programming can be accomplished, for example, so that the quantity/quantities chosen by the operator by means of the knobs 16,17,18 for the display part/parts 14,15 last before the diving is/are shown "permanently", but by depressing the knob/knobs 16,17,18 or the corresponding switches once, the next quantities to be displayed, for example temperature and time, can be displayed in the displays 14,15.

By depressing the knobs a second time, the displays 14,15 can be made to show some other quantity, such as date, and when the knobs are depressed a third time, the display is changed again. The information selected in this manner is shown in the display for a certain, preset time, for example 10 seconds, after which the "displays Nos. 3 and 4" 14,15 start showing the pre-programmed quantities, which were maximal depth and diving time in the exemplifying embodiment described. This embodiment is described by way of example only and for the purpose of illustration, in order to facilitate understanding of the invention.

However, in FIGS. 1 and 1*a*, it has been shown additionally, for the sake of illustration, that the diver's computer 10 is provided with an interface 19, from which it can be connected, for example, to a personal computer, in which case, when on the surface, instead of the knobs 16,17,18 or equivalent switches, the pre-programming can also be carried out by means of the personal computer. Further, when on the surface, in such a case, owing to the computer interface 19, the memory of the diver's computer 10 can be "unloaded", i.e., it is possible to see, for example, what occurred during a certain period of time, i.e., what sorts of dives were performed by the diver.

Figure 2:
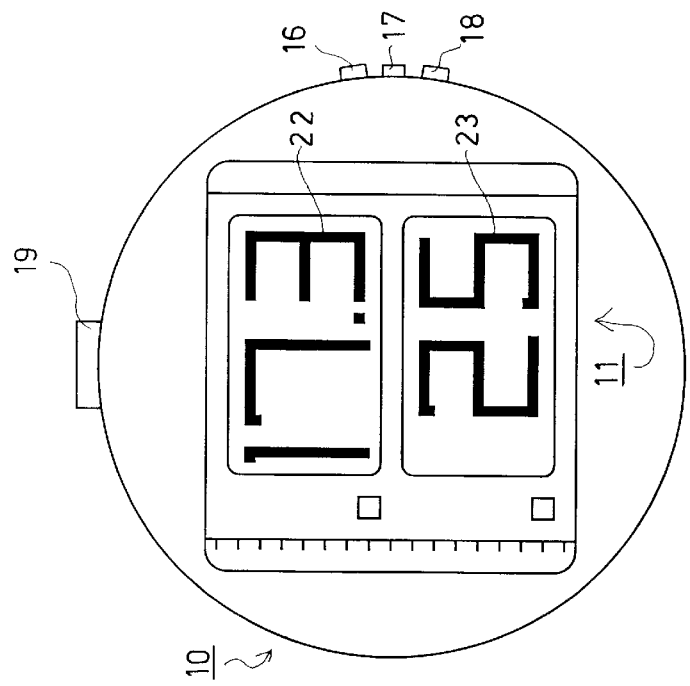
FIG. 2 is a schematic illustration of a second alternative embodiment of the diver's computer in accordance with the invention.

The embodiment of the diver's computer in accordance with the invention shown in FIG. 2 differs from that shown in FIG. 1 exclusively in the respect that the number of displays visible at the same time has been reduced further, so that in this embodiment the display 11 comprises just two display parts 22,23. Thus, in the embodiment shown in FIG. 2, the "display No. 1" 22 has been programmed to display the diving quantity that is considered most important constantly, for example momentary diving depth. The "display No. 2" can be pre-programmed by the diver, for example, by means of the operating knobs 16,17,18, to display the desired diving quantity. In such a case, besides the most important diving quantity shown in the "display No. 1" 22, during diving, the diver can see the desired second important diving quantity in the "display No. 2". By means of the knobs 16,17,18 or equivalent switches, the diver can, during diving, also choose other diving quantities for the display 23 for a certain period of time. In FIG. 2, the programming operations and the computer connections and interfaces 19 have been accomplished in the same way as in the solution of FIG. 1.

Figure 3:
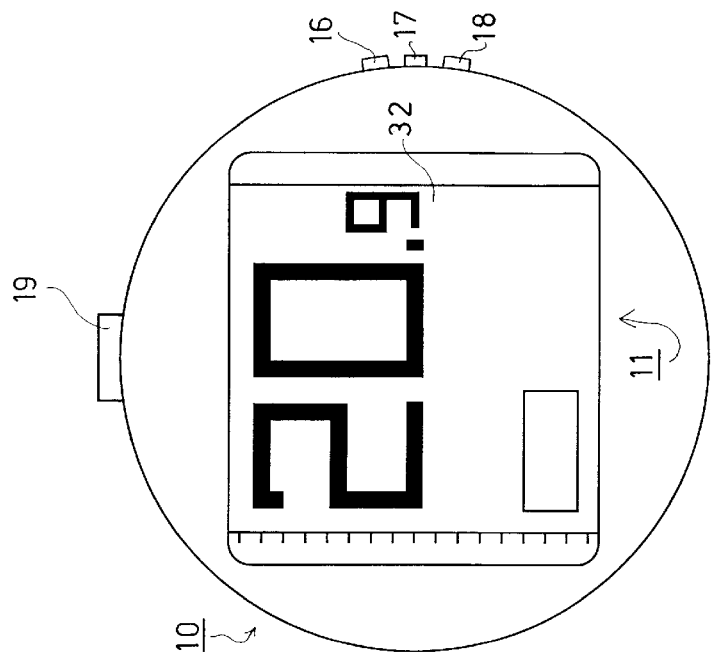
FIG. 3 is a schematic illustration of a third alternative embodiment of the diver's computer in accordance with the invention.

Finally, in FIG. 3, an embodiment of the invention is shown in which the display 11 of the diver's computer 10 comprises just one display part 32. The illustration quality of the display is then, of course, very good, because the numerals in the display 11 have a large size and are readily and clearly visible. In such a case as shown in FIG. 3, the operator pre-programs the display 11 to show the diving quantity considered by him to be the most important. During diving, the operator can, for example by means of the knobs 16,17,18, choose other desired diving quantities for the display for a certain period of time.

In summary, it can be ascertained concerning the above that in a diver's computer in accordance with the invention, good reading quality of the diving quantities is achieved, and the quantities that are considered most important at each particular time can be made to be seen in the monitor of the divers computer, both of which circumstances have a highly essential importance from the point of view of safety. In the other respects, it can be stated that, even though, above, the invention has been described by way of example with reference to the figures in the accompanying drawing, the invention is, however, not confined to the exemplifying embodiments shown in the figures in the drawing only, but different embodiments of the invention can show variation within the scope of the inventive idea defined in the accompanying patent claims. Thus, the examples provided above are not meant to be exclusive and many other variations of the present invention would be obvious to those skilled in the art, and are contemplated to be within the scope of the appended claims.

We claim:

1. In a diver's computer including detector means for measuring and determining diving parameters, and processor means coupled to said detector means for receiving and processing the diving parameters, the improvement comprising:

display means coupled to said processor means for receiving and displaying at least one of the diving parameters, said display means comprising at least one display part programmable by the user to display a respective user-determined one of the diving parameters, and at least one additional display part for constantly displaying a permanently selected one of the diving parameters during diving and/or while on the surface.

2. The diver's computer of claim 1, wherein said at least one display part comprises a first display part programmed to display a first user-determined one of the diving parameters, further comprising means for switching said first display part during diving to display momentarily a second user-determined one of the diving parameters.

3. The diver's computer of claim 1, wherein said at least one display part comprises a first display part programmed to display a first user-determined one of the diving parameters, further comprising programming means for enabling the diver to program said first display part to display the first user-determined one of the diving parameters, said programing means comprising knobs.

4. The diver's computer of claim 1, wherein said at least one display part comprises a first display part programmed to display a first user-determined one of the diving parameters, further comprising display activation means for activating said first display part to display the first user-determined one of the diving parameters, said display activation means comprising knobs.

5. The diver's computer of claim 1, wherein the respective user-determined one of the diving parameters to be displayed on said at least one display part during a dive is selected by the diver while on the surface immediately prior to the dive.

6. The diver's computer of claim 1, further comprising connecting means for connecting the diver's computer to a personal computer, the personal computer being structured and arranged to enable programming of the diver's computer vis-a-vis the respective user-determined diving parameter to be displayed on said at least one display part.

7. The diver's computer of claim 6, wherein said connecting means comprise an interface member.

8. The diver's computer of claim 1, wherein said at least one display part consists of a single display part and are structured and arranged to receive and display only one user-determined diving parameter.

9. The diver's computer of claim 1, wherein said at least one display part comprises first and second display parts structured and arranged to receive and display one user-determined diving parameter and at least one additional, pre-set diving parameter, the user-determined diving parameter being displayed in said first display part, the at least one additional diving parameter being permanently programmed into the diver's computer to be constantly displayed in said second display part during diving and/or while on the surface.

10. The diver's computer of claim 9 wherein said at least one display part further comprise a third display part structured and arranged to receive and display a second one of the user-determined diving parameters.

11. The diver's computer of claim 1, wherein said at least one display part comprises first, second and third display parts stuctured and arranged to receive and display one user-determined diving parameters and at least two additional, pre-set diving parameters, the user-determined diving parameter being displayed in said first display part, a first one of the at least two additional diving parameters being permanently programmed into the diver's computer to be constantly displayed in said second display part during diving and/or while on the surface, a second one of the at least two additional diving parameters being permanently programmed into the diver's computer to be constantly displayed in said third display part during diving and/or while on the surface.

12. The diver's computer of claim 1, wherein said at least one display part comprises first, second, third and fourth display parts structured and arranged to receive and display two user-determined diving parameters and at least two additional, pre-set diving parameters, a first one of the user-determined diving parameters being displayed in said first display part, a second one of the user-determined diving parameters being displayed in said second display part, a first one of the at least two additional diving parameters being permanently programmed into the diver's computer to be constantly displayed in said third display part during diving and/or while on the surface, a second one of the at least two additional diving parameters being permanently programmed into the diver's computer to be constantly displayed in said fourth display part during diving and/or while on the surface.

13. A method for enabling a user to selectively display diving parameters on a diving computer having a display, comprising the steps of:

selecting one of the diving parameters as a first user-determined diving parameter, selecting another one of the diving parameters as a second user-determined diving parameter, measuring and determining diving parameters including the first and second user-determined diving parameters, processing the measured and determined diving parameters, displaying the first user-determined processed diving parameter on a display part of the display of the diving computer, and displaying the second user-determined processed diving parameter on an additional display part of the display of the diving computer.

14. The method of claim 13, further comprising the step of:

connecting the diver's computer to a personal computer, and programming the diver's computer via the personal computer to display the first and second user-determined diving parameters.

15. In a diver's computer including detector means for measuring and determining diving parameters, and processor means coupled to said detector means for receiving and processing the diving parameters, the improvement comprising display means coupled to said processor means for receiving and displaying at least one of the diving parameters, said display means having at least one display part programmable by the user to display a respective user-determined one of the diving parameters, and connecting means for connecting the diver's computer to a personal computer, the personal computer being structured and arranged to enable programming of the diver's computer vis-a-vis the respective user-determined diving parameter to be displayed on said at least one display part.

16. The diver's computer of claim 15, wherein said connecting means comprise an interface member.

17. The diver's computer of claim 15, wherein said at least one display part comprises a first display part programmed to display a first user-determined one of the diving parameters, further comprising means for switching said first display part during diving momentarily to show a second user-determined one of the diving parameters.

18. The diver's computer of claim 15, wherein said at least one display part comprises first, second and third display parts structured and arranged to receive and display one user-determined diving parameters and at least two additional, pre-set diving parameters, the user-determined diving parameter being displayed in said first display part, a first one of the at least two additional diving parameters being permanently programmed into the diver's computer to be constantly displayed in said second display part during diving and/or while on the surface, a second one of the at least two additional diving parameters being permanently programmed into the diver's computer to be constantly displayed in said third display part during diving and/or while on the surface.

19. A method for enabling a user to selectively display diving parameters on a diving computer having a display, comprising the steps of:

selecting one of the diving parameters as a user-determined diving parameter, measuring and determining diving parameters including the user-determined diving parameter, processing the measured and determined diving parameters, displaying the user-determined processed diving parameter on a display part of the display of the diving computer, connecting the diver's computer to a personal computer, and programming the diver's computer via the personal computer to display the user-determined diving parameter.

* * * * *